(12) United States Patent
Yang

(10) Patent No.: US 7,196,430 B2
(45) Date of Patent: Mar. 27, 2007

(54) PARTIAL-POWERED SERIES HYBRID DRIVING SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 11/087,547

(22) Filed: Mar. 24, 2005

(65) Prior Publication Data

US 2005/0161948 A1   Jul. 28, 2005

Related U.S. Application Data

(63) Continuation-in-part of application No. 10/364,391, filed on Feb. 12, 2003, now abandoned.

(51) Int. Cl.
*B60K 6/04* (2006.01)

(52) U.S. Cl. .................................. 290/40 C

(58) Field of Classification Search ............... 290/40 C
See application file for complete search history.

(56) References Cited

U.S. PATENT DOCUMENTS

| | | | |
|---|---|---|---|
| 5,786,640 A | | 7/1998 | Sakai et al. |
| 5,794,422 A | * | 8/1998 | Reimers et al. ............ 56/11.9 |
| 5,845,731 A | | 12/1998 | Buglione et al. |
| 6,059,059 A | * | 5/2000 | Schmidt-Brucken ....... 180/65.3 |
| 6,209,672 B1 | * | 4/2001 | Severinsky ................. 180/65.2 |
| 6,278,280 B1 | * | 8/2001 | Horie et al. ................ 324/436 |
| 6,455,947 B1 | * | 9/2002 | Lilley et al. ............... 290/40 C |
| 6,563,230 B2 | * | 5/2003 | Nada ......................... 290/40 C |
| 6,570,265 B1 | * | 5/2003 | Shiraishi et al. .......... 290/40 C |
| 6,608,396 B2 | | 8/2003 | Downer et al. |
| 6,635,973 B1 | * | 10/2003 | Kagoshima et al. ........ 307/10.1 |
| 6,678,972 B2 | * | 1/2004 | Naruse et al. ................. 37/466 |
| 6,692,405 B2 | | 2/2004 | Minowa et al. |
| 6,784,563 B2 | * | 8/2004 | Nada ......................... 290/40 C |
| 6,808,470 B2 | * | 10/2004 | Boll ............................... 477/6 |
| 6,886,648 B1 | * | 5/2005 | Hata et al. ................... 180/65.2 |
| 6,969,921 B2 | * | 11/2005 | Yoshimatsu ................. 290/1 R |
| 2003/0205422 A1 | * | 11/2003 | Morrow et al. ............. 180/65.2 |
| 2004/0148817 A1 | * | 8/2004 | Kagoshima et al. .......... 37/348 |

FOREIGN PATENT DOCUMENTS

| | | | |
|---|---|---|---|
| DE | 19945449 A1 | * | 3/2000 |
| EP | 965475 A2 | * | 12/1999 |
| EP | 1097830 | | 5/2001 |
| EP | 1097830 A1 | * | 5/2001 |
| FR | 2809352 | | 11/2001 |
| FR | 2809352 A1 | * | 11/2001 |
| GB | 2316376 A | * | 2/1998 |

* cited by examiner

*Primary Examiner*—Joseph Waks
(74) *Attorney, Agent, or Firm*—Rabin & Berdo, P.C.

(57) ABSTRACT

A Partial-Powered Series Hybrid Driving System enables an engine to run with high power and high speed for normal or high load driving. If the load is driven under low-power, low-speed light loading conditions, the present system operates in a series hybrid driving configuration to improve efficiency and reduce pollution by the engine.

10 Claims, 1 Drawing Sheet

PARTIAL-POWERED SERIES HYBRID DRIVING SYSTEM

CROSS-REFERENCES TO RELATED APPLICATIONS

This application is a Continuation-In-Part of my patent application Ser. No. 10/364,391, now abandoned filed Feb. 12, 2003.

BACKGROUND OF THE INVENTION (a) Field of the Invention

The present invention partial powered series hybrid driving system, is related to an innovation characterized by eliminating the installation of electricity-storage-device (E.S.D.) which providing or storing electrical energy for motor driving during system operation, in contrast to traditional hybrid system, the present invention deployed the drive control unit, the first and second electrical machinery unit which carries partial power capacity rating to system's full power capacity, an engine unit with approximate full power capacity rating to system's full power capacity, and a clutch unit installed between the first and second electrical machinery units. The feature of present invention is: the generator unit, the motor unit only provided for light loading condition; during normal loading condition, the clutch unit is engaged and enable an engine running with high efficiency and high power to drive a load, moreover, in the event of low-power, low-speed light-load driving, the clutch unit is disengaged, the engine operating in better efficiency region for driving the first electrical unit to function as a generator, the electricity from the first electrical unit, under the control of drive control unit, is transferred to drive the second electrical unit which functions as a motor for load driving. The system is configured in less power demanding series hybrid operating mode for refining the drawback of low efficiency and high pollutant of engine during low power and low speed operating region.

(b) Description of the Prior Art

Conventionally, single power systems are used in vehicles on land, at sea or in air. In recent years, owing to the consideration of energy saving and pollution control, dual power drive systems have attracted significant R&D investments, particularly in the areas of a hybrid drive system which integrating an internal combustion engine and a motor driven by electrical power from E.S.D. Various developed dual power drive systems are as follows:

1. A full-powered series-connected hybrid system: An engine is used to drive a generator which carries approximate power capacity to the engine, then under the control of drive control unit, the load is driven by a motor which also carries approximate power capacity to the engine, the motor is driven by the electricity generated by the generator; the drawback of the system is that, given various full load rates, efficiency differs excessively; and the power of engine does not support for direct load driving. Since the electricity from generator, under the control of drive control unit is transferred to the motor unit for load driving, therefore the power capacity of generator and motor unit must satisfying the demand of maximum power output. Therefore each of the engine, generator and motor unit must fulfill the demand of system maximum output power capacity, therefore the weight and cost is getting high, and the power of engine is unable to provide direct load driving while electrical units failed.

2. An energy-storing series-connected hybrid system: An engine is used to drive a generator, then, under the control of Drive Control Unit (D.C.U.), the load is driven by a motor that is, driven by the electricity generated by the generator; under light load conditions, part of the electricity generated by the generator is transferred into E.S.D. for storage, and the electricity stored in the E.S.D. is used to drive the motor to drive the load when the engine stops; and under heavy loading condition, the electrical energy from E.S.D. and generator jointly transferred to the motor unit for load driving. This architecture requires the installation of E.S.D, and the power from engine doesn't support directly load driving, therefore the power capacity of motor must satisfy the demand of system maximum output, and the capacity of generator shall be reduced with the installation of E.S.D, the power of engine is unable to offer load driving while electrical units failed.

3. A parallel-connected drive system: An engine is used to directly drive the load, whereas a generator is driven to charge E.S.D. at light load, so that once the engine stops, the electricity stored in the E.S.D. is used to drive the motor to drive the load; under heavy load conditions, the load is jointly driven by the engine as well as the motor driven by the electricity of the E.S.D.; the drawback of the system is that it is necessary to install E.S.D. of sufficient capacity, and high cost.

SUMMARY OF THE INVENTION

The present invention partial powered series hybrid driving system, is related to an innovation characterized by eliminating the installation of electricity-storage-device (E.S.D.) for providing or storing electrical energy for motor driving during system operation, in contrast to traditional hybrid system, the present invention deployed the drive control unit, the first and second electrical machinery unit which carries partial power capacity rating to system's full power capacity, an engine unit with approximate full power capacity rating to system's full power capacity, and a clutch unit installed between the first and second electrical machinery units. The feature of present invention is: the generator unit, the motor unit only provided for light loading, during normal loading condition, the clutch unit is engaged and enable an engine running with high efficiency and high power to drive a load, moreover, in the event of low-power, low-speed light-load driving, the clutch unit is disengaged, the engine operating in better efficiency region for driving the first electrical unit to function as a generator, the electricity from the first electrical unit, under the control of drive control unit, is transferred to drive the second electrical unit which functions as a motor for load driving. The system is configured in less power demanding series hybrid operating mode for refining the drawback of low efficiency and high pollutant of engine during low power and low speed operating region. The present partial powered series hybrid driving system only deploy starting battery for engine, removing the installation of main E.S.D. pack, and the generator and motor units only operates under light loading, the capacity of electrical units could be reduced; the engine offers direct load driving under high load and high speed driving, under some specific situation, such as the fail of the series drive train, the power of engine could also be transferred for light load driving. In contrast to traditional full powered series powertrain system, the present architecture only requires lighter and cheaper components and eliminating the necessity of expensive, room-occupied heavy E.S.D.

DETAILED DESCRIPTION OF THE PREFERRED EMBODIMENTS

Figure 1:
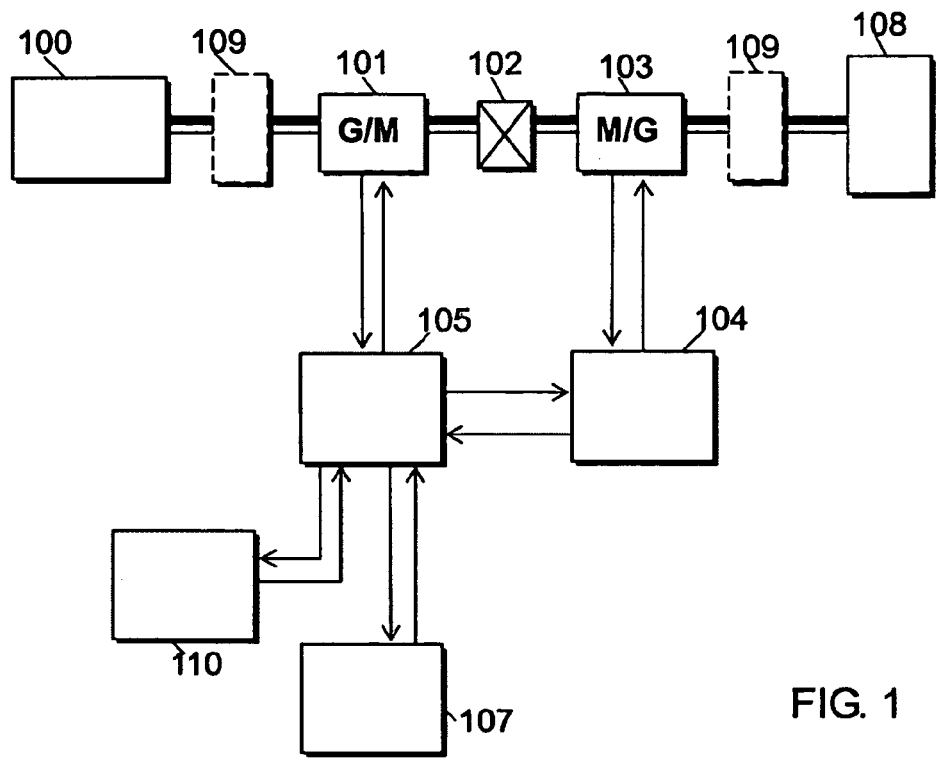
FIG. 1 is a block chart of a preferred embodiment of the present invention.

Referring to FIG. 1 for one of the block charts of the system in accordance with the present invention, wherein, in the present partial powered series hybrid driving system, an engine output shaft, the shaft of the first electrical unit, and the shaft of the second electrical unit are connected in series sequential transmission structure, and the structure comprising:

an engine unit 100 implemented by various types of Internal Combustion Engines (I.C.E.) in use; utilizing various types of fuels and equipped various peripheral devices, the output shaft of I.C.E. is connected to the input end of rotary shaft of the first electrical unit 101, and, the first electrical unit 101 that comprises AC or DC, brushless or brushed rotary electric machines, functioning as a generator, or capable of being converted to a generator or a motor in terms of its function; one end of the rotary shaft is driven by the I.C.E. unit 101, and the other end of the rotary shaft is connected to the input end of clutch unit 102;

a clutch 102 controlled manually, mechanically, pneumatically or oil-hydraulically, or controlled by an electromagnetic force, to enable (close) or interrupt (open) transmission of rotary mechanical energy;

the second electrical unit 103 that comprises AC or DC, brushless or brushed rotary electric machines, functioning as a motor, or capable of being converted to a motor or a generator in terms of its function; the input end of the rotary shaft is driven by the clutch unit 102, and the other end of the rotary shaft is connected to the load 108;

a drive control unit 104 to perform full or partial of the functions listed below: the engage or disengage of clutch unit 102; or to control the output status of the first electrical unit 101 functioning as a generator, or to control the rotating direction, rotational speed, torque and amperage of the second electrical unit 103 functioning as a motor; or to control the first electrical unit 101 to function as a motor, or to control both or one of the first electrical unit 101 or second electrical unit 103 to function as motor for regenerative breaking to recharge the engine starting E.S.D. 110;

a central control unit 105 composed of solid-state or electromechanical devices, or chips, and related software for receiving the control from a manual control interface 107 to control the operation of the present partial powered series hybrid driving system, and for controlling the drive control unit 104 that drive the first electrical unit 101, the second electrical unit 103, the clutch unit 102, and I.C.E. unit 100, and controlling the feedback, monitoring, coordination and interaction among all units in the system;

a starting battery 110 comprising a conventional rechargeable battery unit or other type of E.S.D. such as super capacitor, intended to start the engine unit 100 or supply power to peripheral equipment; the item may or may not to be installed depending on requirement;

the manual control interface 107 comprising solid-state or electromechanical devices, or chips, and related software to receive inputs for manual control in order to control the present partial powered series hybrid driving system;

a transmission unit 109 comprising any types of automatic, semi-automatic or manual transmission units and to be installed between the shaft of the engine unit 100 and the shaft of the first electrical unit 101, or between the shaft of the first electrical unit 101 and the input terminal of the clutch 102, or between the output terminal of the clutch 102 and the shaft of the second electrical unit 103, or between the shaft of the second electrical unit 103 and the load 108. The transmission unit 109 may or may not to be installed depending on requirement.

A load unit 108 for the partial powered series hybrid driving system, is the loading installed by demand which requires power from rotary electrical machinery for operating the land, maritime, airborne vehicles or industrial equipment.

The present partial powered series hybrid driving system has at least the following primary functions:

output from the engine unit 100 drives the generator formed by the first electrical unit 101; the clutch 102 is installed between the shaft of the generator formed by the first electrical unit 101 and the shaft of the motor formed by the second electrical unit 103; the clutch 102 is not coupled when the load 108 is in a light load state; the low-speed output from the engine unit 100 operates in high efficiency region with less power required to drive the first electrical unit 101 functioning as the generator to generate electricity; then, with the function of D.C.U. 104, the electricity produced by the generator formed by the first electrical unit 101 and the motor formed by the second electrical unit 103 to drive the load 108, in a less power demanding status wherein the operation is performed by the series-connected drive system; and the clutch 102 is closed and the load 108 is driven by the kinetic energy outputted from the engine unit 100.

Furthermore, the present partial powered series hybrid driving system has the following functions which are optional:

If the I.C.E. unit 100 is not equipped with starting motor, the clutch 102 is not coupled; instead, the first electrical unit 101 functions as a motor and driven by the electricity supplied by the starting battery 110 to activate the operation of the engine unit 100;

The clutch unit 102 is disengaged (open), with the power from starting battery 110 to drive the second electrical unit 103 which functioning as motor rotating in forward direction for low-speed vehicle driving or in reverse direction for vehicle backward driving.

The clutch unit 102 is engaged (close), with the power from engine unit 100 to drive the load 108 for vehicle forward driving or backward driving.

The clutch unit 102 is disengaged, the engine unit 100 drives the first electrical unit 101 to function as a generator which then outputs electricity to recharge the starting battery set 110 or other electrically driven loads.

During the breaking operation, If the clutch unit 102 is disengaged, the second electrical unit 103, can function as a generator in order to recharge the starting battery set 110 or other electrically driven loads, or attaching an electricity-consuming load connected so as to achieve the function of regenerative breaking.

Figure 2:
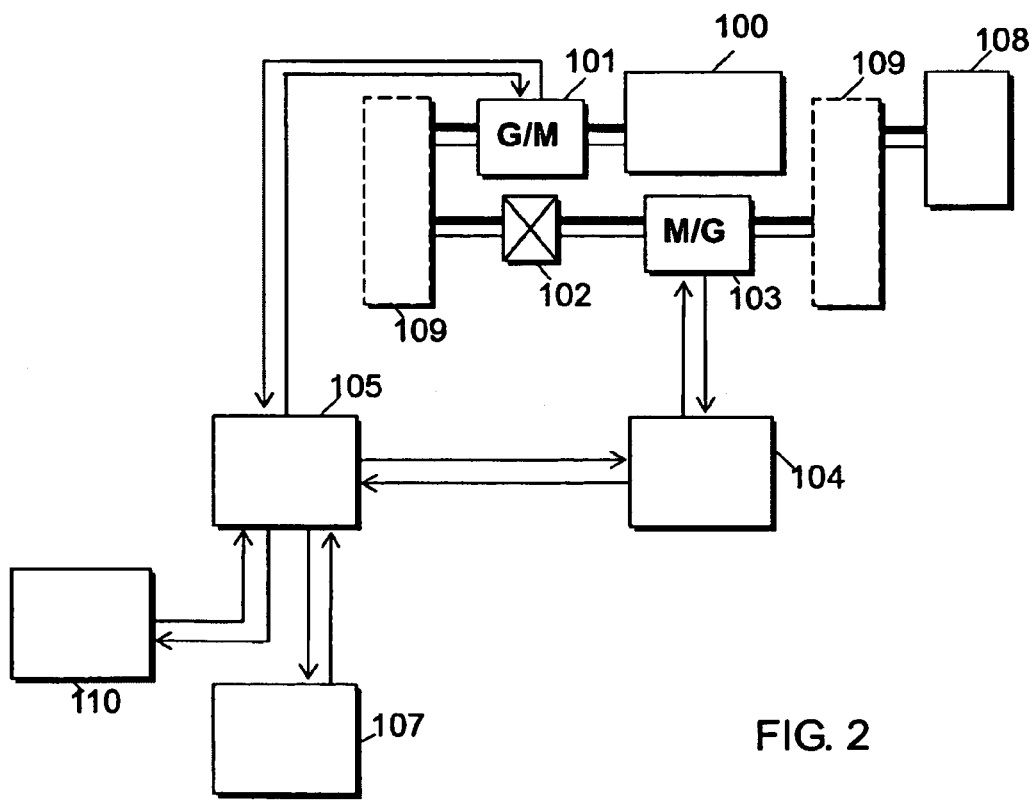
FIG. 2 is another block chart of the preferred embodiment of the present invention.

Now referring to FIG. 2 for another block chart of the preferred embodiment of the present invention, the shaft of the engine unit and the shaft of the second electrical unit are arranged in parallel configuration. For the flexibility of spatial arrangement, the output shaft of engine unit 100 and the output shaft of the second electrical unit 103 could be arranged in parallel configuration without changing the operating feature of present invention.

In short, the present invention partial powered series hybrid driving system, is related to an innovation characterized by eliminating the installation of electricity-storage-device (E.S.D.) which providing or storing electrical energy for motor driving during system operation. In contrast to traditional hybrid system, the present invention deployed the drive control unit, the first and second electrical machinery unit which carries partial power capacity rating to system's full power capacity, an engine unit with approximate full power capacity rating to system's full power capacity, and a clutch unit installed between the first and second electrical machinery units. The feature of present invention is: the generator unit, the motor unit only provided for light loading condition; during normal loading condition, the clutch unit is engaged and enable an engine running with high efficiency and high power to drive a load, moreover, in the event of low-power, low-speed light-load driving, the clutch unit is disengaged, the engine operating in better efficiency region for driving the first electrical unit to function as a generator, the electricity from the first electrical unit, under the control of drive control unit, is transferred to drive the second electrical unit which functions as a motor for load driving. The system is configured in less power demanding series hybrid operating mode for refining the drawback of low efficiency and high pollutant of engine during low power and low speed operating region. The present invention is innovative, and the functions it puts forth are definite; and this application is duly filed for examination.

The invention claimed is:

1. A hybrid drive system for driving a load, comprising:
an internal combustion engine, the engine being operable in a plurality of rotation speed ranges, including a high-efficiency range;
a first electrical unit having a rotary component that is coupled to a rotary power output component of the engine;
a second electrical unit having a rotary component that is coupled to the load;
a clutch coupled to the rotary components of the first and second electrical units for connecting the rotary power output component of the engine and the rotary component of second electrical unit to transmit rotary power or interrupt transmission of rotary power; and
control means for engaging the clutch to couple the rotary power output component of the engine to the load when the load is being driven in a high-power range, for disengaging the clutch to isolate the rotary power output component of the engine from the load when the load is being driven in a reduced power range, for operating the engine in its high-efficiency range when the load is being driven in the reduced power range, and for operating the second electrical unit as a motor and the first electrical unit as a generator that supplies electricity to the second electrical unit when the load is being driven in the reduced power range.

2. The hybrid drive system of claim 1, wherein the control means further comprising means for engaging the clutch for coupling the rotary power of the engine to the load.

3. The hybrid drive system of claim 1, wherein the engine is equipped with a starting motor and a starting battery which provides electricity to the starting motor.

4. The hybrid drive system of claim 3, wherein the engine is equipped with a generator directly-driven or transmitted via a transmission unit for charging the starting battery with engine power.

5. The hybrid drive system of claim 1, further comprising a starting battery, and wherein the control means further comprises means for disengaging the clutch, supplying energy from the battery to the first electrical unit, and operating the first electrical unit as a motor to start the engine.

6. The hybrid drive system of claim 1, further comprising a starting battery, and wherein the control means further comprises means for disengaging the clutch and operating the first electrical unit as a generator to charge the battery.

7. The hybrid drive system of claim 1, further comprising a starting battery, and wherein the control means further comprises means for engaging the clutch during braking of a vehicle and operating the second electrical unit as a generator to charge the battery by converting the inertia kinetic energy into electrical energy during deceleration or braking of the load.

8. The hybrid drive system of claim 1, wherein the system is installed in a vehicle.

9. The hybrid drive system of claim 1, wherein the system is installed in industrial machinery.

10. The hybrid drive system of claim 1, wherein the system is installed in industrial equipment.

\* \* \* \* \*